United States Patent Office 3,292,348
Patented Dec. 20, 1966

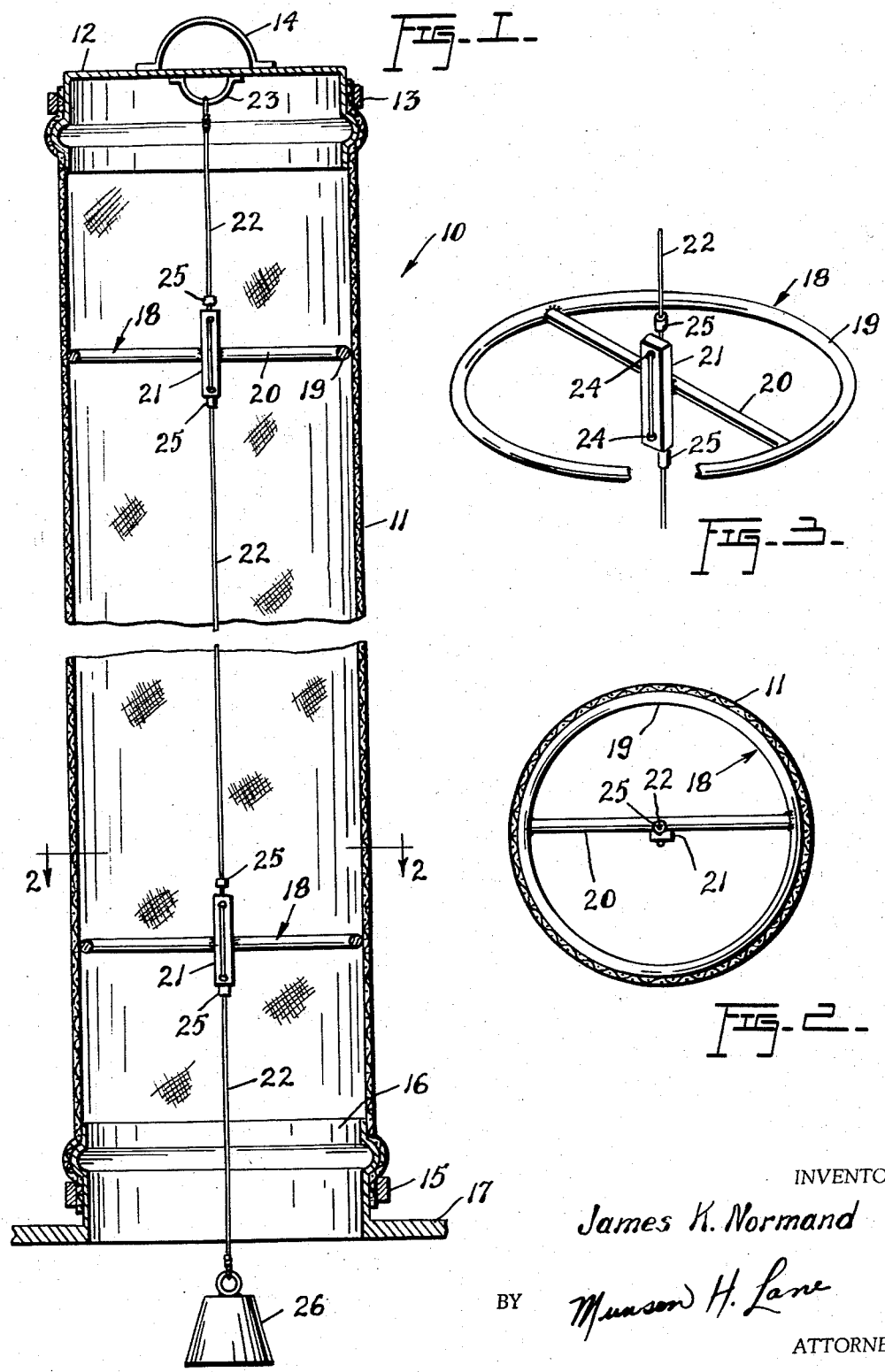

3,292,348
SUSPENSION MEANS FOR FILTER BAGS
James K. Normand, Big Spring, Tex., assignor to Sid Richardson Carbon & Gasoline Co., Fort Worth, Tex., a corporation of Texas
Filed Apr. 24, 1964, Ser. No. 362,341
2 Claims. (Cl. 55—379)

This invention relates to new and useful improvements in filter bags, and in particular the invention concerns itself with improvements in filter bags which are used in the production of carbon black.

Such filter bags have a vertically disposed tubular bag body which is suspended by its upper end from a supporting cap, and when carbon black laden gases are passed upwardly through the bag body, the carbon is filtered out on the inner surface of the bag body while free gases flow therethrough. The accumulated carbon is cleaned out by passing gases in the reverse direction, that is, from the outside to the inside of the bag body, and during this procedure the bag body has a tendency to collapse. Accordingly, it is customary to provide vertically spaced rings within the bag body to support the same against collapsing, such rings being either attached to the bag body itself or suspended by links or rods.

When the filter bag is in operation, the tendency of the bag body to collapse sometimes causes the ring attaching means to break away from the bag body or the ring suspending rods to separate, thus permitting the rings to drop to the bottom of the bag. Also, the rings tend to twist out of a horizontal plane, which causes the suspending rods to puncture the bag body, in which event the filtering action is impaired and the bag body requires replacement.

It is, therefore, the principal object of the invention to eliminate the difficulties above outlined, this being attained by the provision of means for supporting the rings in a suspended manner within the bag body so that they are effectively able to sustain the same against collapsing, but so that they are entirely free of attachment to the bag body itself and are unable to twist and puncture the bag. The ring supporting means of the invention are durable, without links and wholly independent of the bag body, whereby the above mentioned disadvantages of conventional ring mountings are not encountered.

While the invention is primarily intended for use in carbon black filter bags, the teachings of the invention have a general application to filter bags of various types, including those used for filtering dust from air, and the like.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a vertical sectional view of a filter bag embodying the ring suspension device of the invention;

FIGURE 2 is a cross-sectional view, taken susbtantially in the plane of the line 2—2 in FIGURE 1; and FIGURE 3 is a perspective view of one of the rings with its suspension means.

Referring now to the accompanying drawings in detail, the reference numeral 10 generally designates a filter bag comprising a vertically disposed, tubular filter bag body 11 which is suspended by its upper end from a supporting cap 12, being secured thereto by a suitable annular clamp 13. The top of the cap 12 is equipped with a bail 14 whereby the entire device is suspended from a suitable overhead support (not shown), in accordance with conventional practice. The lower end of the bag body 11 is secured, as by a suitable annular clamp 15, to an annular thimble 16 provided on the bag house floor 17.

The bag body 11 is sustained against inward collapsing by a set of vertically spaced rings 18 which supportably engage the inner surface of the bag body but, in accordance with the invention, are entirely free of direct attachment thereto.

Each of the rings 18 comprises an annulus 19 which has welded or otherwise secured thereto a transverse bar 20, and a vertically elongated support element or post 21 is welded or otherwise secured to the bar 20 at the center of the annulus, the post 21 projecting both above and below the annulus, as shown.

The several rings 18 are supported within the bag body 11 in a suspended manner by continuous vertical cable means 22 disposed axially in the bag body, the upper end of the cable means being secured to a suitable eye or hanger 23 which is suitably secured to the underside of the cap 12. The post 21 of each of the rings 18 is provided in its end portions with apertures 24 through which the cable means 22 are passed, and suitable crimp connectors 25 are clamped to the cable means above and below the post to maintain desired spacing of the rings. In this manner the several rings are suspended by the cable means from the cap 12 and are thus supported within the bag body 11 without any direct attachment to the latter and without rods, links or frayed cable ends such as could puncture the bag.

In order to maintain the cable means 22 taut and prevent the rings 18 from twisting out of a horizontal plane as well as to support the rings in proper, vertically spaced relation, a suitable weight 26 is suspended from the lower end of the cable means as shown, or alternatively, the post 21 of the lowermost ring may be extended downwardly and the weight 26 may be secured to the lower end thereof.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a filter bag for separating solid particles from a gaseous fluid, the combination of a supporting cap, a vertically disposed tubular bag body suspended by its upper end from said cap and open at the bottom thereof, an annular floor thimble having the lower end of said bag body connected thereto, a plurality of vertically spaced rings provided in said body normally in loose engagement with the inner surface of the latter to prevent collapsing but free of attachment thereto, each of said rings including an annulus and a support element provided at the center thereof, and vertically extending flexible and continuous cable means disposed coaxially in said body and connected at the upper end thereof to said cap, the support elements of said rings being mounted on said cable means and the latter constituting sole means for supporting the rings in said body, said rings also including a transverse bar spanning said annulus, each of said support elements comprising an upright post secured to said bar, said cable means extending through each of said posts.

2. The device as defined in claim 1 wherein each of said posts is provided with vertically spaced apart apertures having said cable means threaded therethrough, and keeper means provided on said cable means above and below each of said posts.

References Cited by the Examiner

UNITED STATES PATENTS

| | | | |
|---|---|---|---|
| 783,743 | 2/1905 | D'Olier | 248—328 X |
| 1,509,912 | 9/1924 | Stebbins | 55—303 X |
| 2,005,334 | 6/1935 | Casper | 248—328 |
| 2,533,268 | 12/1950 | Lanter | 55—379 X |
| 2,573,844 | 11/1951 | Hersey | 55—294 |
| 2,976,953 | 3/1961 | Haas et al. | 55—379 X |
| 2,985,307 | 5/1961 | Grasmere et al. | 210—493 X |

FOREIGN PATENTS

| | | |
|---|---|---|
| 345,918 | 12/1921 | Germany. |
| 484,215 | 10/1929 | Germany. |

HARRY B. THORNTON, *Primary Examiner.*

D. TALBERT, *Assistant Examiner.*